(12) United States Patent
Waddington et al.

(10) Patent No.: US 6,221,290 B1
(45) Date of Patent: Apr. 24, 2001

(54) INJECTION MOLDED TONNEAU COVER FOR PICK-UP TRUCK

(75) Inventors: Donald Waddington; Floyd R. Dickson; Ean Sippel, all of Huntsville (CA)

(73) Assignee: Algonquin Industries International, Inc., Huntsville (CA)

( * ) Notice: Subject to any disclaimer, the term of this patent is extended or adjusted under 35 U.S.C. 154(b) by 0 days.

(21) Appl. No.: 09/299,113

(22) Filed: Apr. 23, 1999

(51) Int. Cl.[7] .................................................. B29C 44/02
(52) U.S. Cl. ........................... 264/45.3; 29/897.2; 264/51
(58) Field of Search ........................... 264/51, 46.4, 45.3; 29/897.2

(56) References Cited

U.S. PATENT DOCUMENTS

| Re. 33,790 | 1/1992 | Huber . | |
| D. 281,487 | 11/1985 | Chapman . | |
| D. 403,292 | 12/1998 | Bogard . | |
| 3,883,627 | * 5/1975 | Fitts | .................................. 264/51 |
| 4,479,677 | 10/1984 | Gulette et al. . | |
| 4,741,570 | * 5/1988 | Lovaas | .................................. 296/100 |
| 4,762,360 | 8/1988 | Huber . | |
| 4,792,178 | 12/1988 | Kokx . | |
| 4,861,092 | 8/1989 | Bogard . | |
| 5,301,995 | 4/1994 | Isler . | |
| 5,743,586 | * 4/1998 | Nett | .................................. 296/100 |
| 5,857,729 | 1/1999 | Bogard . | |
| 6,034,320 | * 3/2000 | Malcherczyk et al. | .............. 136/251 |

* cited by examiner

Primary Examiner—Allan R. Kuhns
(74) Attorney, Agent, or Firm—Harness, Dickey & Pierce, PLC

(57) ABSTRACT

A tonneau cover assembly for the open box of a pick-up truck includes a cover which is manufactured using an injection molding process. The cover is molded from a rigid polyurethane foam reaction injection molding (RIM) system. The cover is reinforced by a reinforcement frame and is attached to a mounting bracket using a hinge assembly. A slam action bracket secures the cover in its closed position and a pair of gas struts supports the cover in its open position. The mounting bracket is adapted to be secured to the pick-up box.

10 Claims, 2 Drawing Sheets

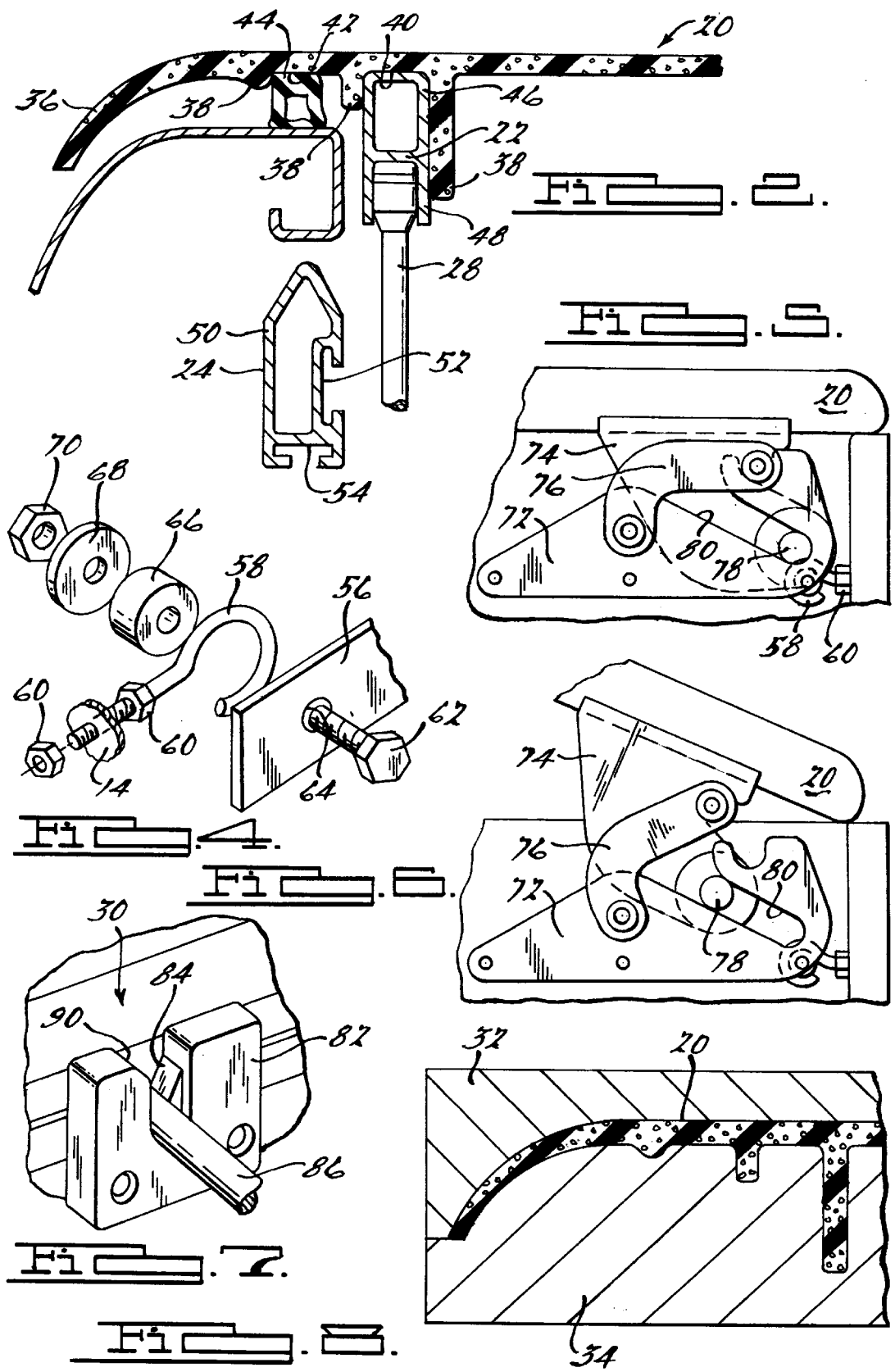

INJECTION MOLDED TONNEAU COVER FOR PICK-UP TRUCK

FIELD OF THE INVENTION

The present invention relates to pick-up truck bed covers. More particularly, the present invention relates to an injection molded plastic tonneau cover for a pick-up truck.

BACKGROUND OF THE INVENTION

The popularity of the pick-up truck with the handyman, the camper, the hunter and the vacationer has significantly increased because of the pick-up trucks utility combined with the recent improvements in both styling and comfort. One of the disadvantages associated with the pick-up truck is its open cargo box. Any item placed in the open cargo box is susceptible to weathering and/or loss by theft.

A variety of pick-up box or tonneau covers for covering the open boxes of trucks exist in the prior art. These prior art covers are manufactured from canvas, single panels and caps, and multi-piece covers of interconnected panels. Despite the recognized need for tonneau covers, the majority of pick-up owners have been dissuaded from purchasing them because of various reasons including high cost, poor appearance, inadequate security, difficult installation, lack of utility and difficult storage of the cover. Consequently, a large number of prospective customers are available for an improved pick-up truck tonneau cover.

SUMMARY OF THE INVENTION

The present invention provides the art with an injection molded plastic tonneau cover (typically one-piece) molded from a rigid polyurethane or polyurea structural foam reaction injection molding (RIM) system. The material's properties include large-part moldability, low-viscosity liquid molding, high strength, stiffness and excellent surface quality. A blowing agent is added to the material, causing the material to expand as the material fills the mold producing an internal micro-cellular structure (foam) while developing a hard skin. If desired, a reinforcing filler can be added to the material. The injection molded foamed material design provides a better combination of rigidity, flexibility, low weight, and surface finish. The injection molded foamed materials also provide the ability to modify this combination depending upon the customer's or the motor vehicle's requirements.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a cross-sectional view of the interface between the pick-up box and the tonneau cover assembly of the present invention;

FIG. 4 is an enlarged exploded view of the connection between the pick-up truck box and the tonneau assembly of the present invention;

FIG. 5 is an enlarged view of the hinge mechanism of the tonneau cover assembly of the present invention in a closed position;

FIG. 6 is an enlarged view of the hinge mechanism of the tonneau cover assembly of the present invention in an open position;

FIG. 7 is a perspective view of a slam action bracket of the tonneau cover assembly of the present invention; and FIG. 8 is a partial cross-sectional view of the cover being molded.

DETAILED DESCRIPTION OF THE PREFERRED EMBODIMENT

Figure 1:
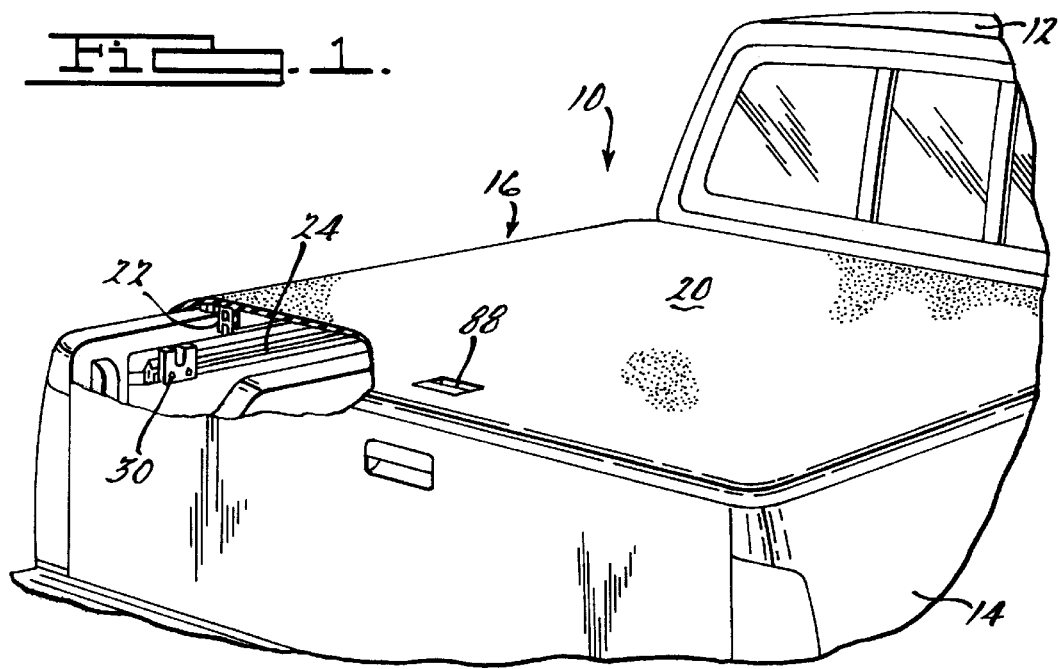
FIG. 1 is a perspective view partially in cross-section of a pick-up truck incorporating the unique tonneau cover assembly in accordance with the present invention with the cover in a closed position.

Referring now to the drawings in which like reference numerals designate like or corresponding parts throughout the several views, there is shown in FIG. 1 a pick-up truck incorporating the unique tonneau cover according to the present invention which is indicated generally by the reference numeral 10. Pick-up truck 10 comprises a cab portion 12, a pick-up box portion 14 and a tonneau cover assembly 16. Cab portion 12 is for driving the pick-up truck and box portion 14 is for storing and/or transporting cargo. Box portion 14 is open to the exterior of the vehicle and tonneau cover assembly 16 is typically an after-market cover assembly which is utilized to protect and/or hide various cargo within box portion 14.

Figure 3:
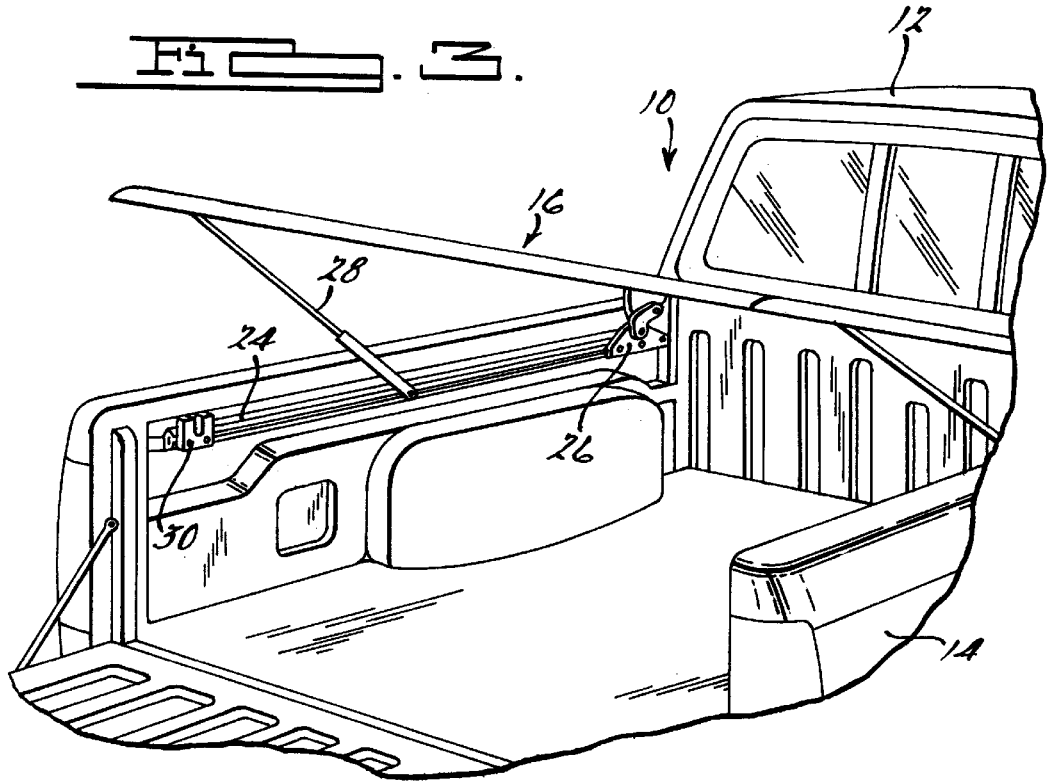
FIG. 3 is a perspective view of the pick-up truck incorporating the unique tonneau cover of the present invention with the cover in an opened position.

Referring now to FIGS. 2 and 3, tonneau cover assembly 16 comprises a cover 20, a reinforcement frame 22, a mounting track 24, a hinge assembly 26, a telescopic gas strut 28 and a slam action bracket 30. Cover 20 is a generally planar single piece cover which is injection molded from a rigid polyurethane, polyurea or a combination of polyurethane and polyurea structural foam reaction injection molding (RIM) system. If desired, a reinforcement filler can be added to the material. The cover material properties include large part moldability, low-viscosity liquid molding, high strength, stiffness and excellent surface quality. FIG. 8 illustrates cover 20 during the molding process. An upper die 32 and a lower die 34 combine to produce cover 20. During molding, a blowing agent is added to the polymer, causing the polymer to expand as the material fills the mold producing an internal micro-cellular structure (foam) while developing a hard skin. The injection molded foamed polymer design provides a better combination of rigidity, flexibility, low weight, and surface finish than the prior art technologies. In addition, this combination can be modified depending on customer/motor vehicle requirements.

Injection molded tonneau cover 20 provides design flexibility for the development engineers. Because cover 20 is injection molded, it allows the designers more freedom to make complex shapes with closed cross sections. As shown in FIG. 2, cover 20 includes a curved edge 36 for mating with box portion 14 and a plurality of reinforcement ribs 38 which form a mounting slot 40 for reinforcement frame 22 and a seal groove 42 within which a seal 44 is disposed. Seal 44 protects the contents of box portion 14 from dirt and water. In addition to the freedom provided to the designers due to the injection molding process, many standard finishing techniques for cover 20 can be utilized, including but not limited to in-molded color, body color paint and the like.

The injection molding process for tonneau cover 20 allows a one piece cover design to be produced at a competitive cost due to the lower pressure required. Although a higher cost for the tool is required, cover 20 is formed in a "one-shot" process. This provides a distinct advantage over the prior art covers which are typically manufactured using fibre-glass layups although there are several prior art plastic vacuum formed tonneau covers on the market using an ABS inner and outer shell bonded together.

Finally, by utilizing a material with significantly lower density, and having the ability to better control rib design, the manufacturer of tonneau cover 20 can produce a cover that is 40–60% lighter than the prior art tonneau covers. A lighter weight tonneau cover is much easier for a consumer to install and remove from pick-up box portion 14 as their cargo needs change. Lighter weight also reduces the shipping costs for the distribution of such a large part. The lighter weight of cover 20 also puts less stress on frame 22, track 24, hinge assembly 26, gas strut 28 and bracket 30 resulting in reduced failures of the components and thus fewer warranty issues.

Thus, the material selection for cover 20 in combination with the unique molding process for cover 20 provide the manufacturer with a superior quality cover which provides significant advantages over the prior art covers.

Reinforcement frame 22 is secured to each longitudinal side of cover 20 within mounting slot 40. Frame 22 is typically an aluminum extrusion which includes a box-section 46 and a U-shaped channel section 48. Box-section 46 provides the necessary support while channel section 48 provides for the attachment of strut 28, hinge assembly 26 and various other components as required. Frame 22 is secured to cover 20 by screwing, riveting, bonding by other means known well in the art.

Mounting track 24 is the part of cover assembly 16 which secures cover assembly 16 to pick-up box portion 14 of pick-up truck 10. Track 24 is an aluminum extrusion which includes a closed section 50, a side groove 52 and a bottom groove 54. Track 24 is positioned at each side of box portion 14 such that side groove 52 opens to the interior of box portion 14. Track 24 is secured at each end to box portion 14 as shown in FIG. 4. An eyelet bracket 56 is inserted into side groove 52 and is secured to track 24 by screwing, riveting or other means known in the art. A box eyelet 58 is secured to box portion 14 by being inserted through a hole (not shown) and adjustably secured in place by a pair of nuts 60. A bolt 62 is inserted through a hole 64 in bracket 56 such that it extends through box eyelet 58. A rubber expansion plug 66 is positioned over bolt 62 between bolt 62 and eyelet 58. Finally, a washer 68 and a nut 70 are assembled to bolt 62 to retain the assembly of the components.

Hinge assembly 26 is secured to track 24 adjacent cab portion 12. Hinge assembly 26 permits the movement of cover 20 between a closed position as shown in FIGS. 1 and 5 and an open position as shown in FIGS. 3 and 6. Hinge assembly 26 comprises a stationary bracket 72, a pivoting bracket 74 and a hinge bracket 76. Stationary bracket 72 is secured to mounting track 24 and box portion 14 by bolting, riveting or other methods known in the art. Pivoting bracket 74 is secured to reinforcement frame 22 by bolting, riveting or other methods known in the art. Hinge bracket 76 is pivotably secured to stationary bracket 72 and pivotably engages pivoted bracket 74 as shown in FIGS. 5 and 6. Pivoting bracket 74 includes a guide member 78 which engages a slot 80 within stationary bracket 72 to secure cover 20 to box portion 14. The engagement between hinge bracket 76 and stationary bracket 72 in conjunction with the engagement between hinge bracket 76 and pivoting bracket 74 secures cover 20 to mounting track 24 while still providing for the simple removal of cover 20 from bracket 76.

Telescopic gas strut 28 is pivotably secured to reinforcement frame 22 at one end and pivotably secured to mounting track 24 at its opposite end as shown in FIGS. 2 and 3. Gas strut 28 provides assistance in the raising of cover 20 as well as providing support to keep cover 20 in its open position as shown in FIG. 3 as is well known in the art. A separate gas strut 28 is located on each side of cover 20. Gas strut 28 is releasably secured to either or both of frame 22 and track 24 to facilitate the removal of cover 20.

Referring now to FIG. 7, slam action bracket 30 comprises a housing 82 and a spring loaded plunger 84. A separate slam action bracket is located on both sides of box portion 14. A spring loaded plunger rod 86 is assembled to each reinforcement frame 22. A center mechanism with a lock 88 (FIG. 1) is attached to cover 20 in order to provide axial movement for plunger rod 86. Housing 82 defines a slot 90 which accepts plunger rod 86. Spring loaded plunger 84 is designed to allow plunger rod 86 to enter slot 90 but not to allow plunger rod 86 to exit slot 90. Thus, to close cover 20, the consumer pushes on the top of cover 20 to engage each plunger rod 86 with its respective slot 90 while plunger 84 secures rod 86 within slot 90. In order to open cover 20, the consumer must activate the center mechanism which will axially withdraw plunger rod 86 from slot 90 towards lock 88 allowing for plunger rod 86 to clear plunger 84 and permit opening of cover 20. Upon release of the center mechanism, plunger rod 86 moves back to its original position where it will engage plunger 84 and slot 90 during closing of cover 20.

While the above detailed description describes the preferred embodiment of the present invention, it should be understood that the present invention is susceptible to modification, variation and alteration without deviating from the scope and fair meaning of the subjoined claims.

What is claimed is:

1. A method for producing a tonneau cover for a bed of a pick-up truck, said method comprising:
   providing a mold;
   having a cavity defined by a generally rectangular planar section sized to cover said bed of said pick-up truck, said cavity having a curved section located on at least one side of said planar section;
   injecting a combination of polyurethane and polyurea material into said cavity of said mold;
   adding a blowing agent to said plastic material;
   allowing said plastic material to cure; and
   removing said tonneau cover from said mold.

2. The method according to claim 1, further comprising the step of adding a coloring agent to said mold.

3. The method according to claim 1, further comprising the step of molding a rib integral with said tonneau cover.

4. The method according to claim 1, further comprising the step of attaching a reinforcement member to said tonneau cover.

5. The method according to claim 1, further comprising the step of adding a reinforcing filler to said plastic material.

6. A method for producing a tonneau cover comprising:
   providing a mold;
   injecting a combination of polyurethane and polyurea material into said mold;
   adding a blowing agent to said plastic material;
   allowing said plastic material to cure; and
   removing said tonneau cover from said mold.

7. The method according to claim 6, further comprising the step of adding a coloring agent to said mold.

8. The method according to claim 6, further comprising the step of molding a rib integral with said tonneau cover.

9. The method according to claim 6, further comprising the step of attaching a reinforcement member to said tonneau cover.

10. The method according to claim 6, further comprising the step of adding a reinforcing filler to said plastic material.

* * * * *